United States Patent
Barrenscheen et al.

(10) Patent No.: US 6,904,472 B2
(45) Date of Patent: Jun. 7, 2005

(54) RECEIVING DEVICE FOR RECEIVING DATA

(75) Inventors: Jens Barrenscheen, München (DE); Thomas Wünsche, Ilmmünster (DE)

(73) Assignee: Infineon Technologies AG, Munich (DE)

(*) Notice: Subject to any disclaimer, the term of this patent is extended or adjusted under 35 U.S.C. 154(b) by 154 days.

(21) Appl. No.: 10/100,240

(22) Filed: Mar. 18, 2002

(65) Prior Publication Data

US 2002/0147863 A1 Oct. 10, 2002

(30) Foreign Application Priority Data

Mar. 17, 2001 (DE) ......................... 101 12 950

(51) Int. Cl.[7] .............................................. G06F 3/00
(52) U.S. Cl. ......................... 710/15; 710/100; 710/33
(58) Field of Search ..................... 710/1, 5, 15, 33, 710/100

(56) References Cited

U.S. PATENT DOCUMENTS

| 5,323,385 | A | | 6/1994 | Jurewicz et al. |
| 5,469,150 | A | | 11/1995 | Sitte |
| 5,729,755 | A | | 3/1998 | Turski |
| 5,854,454 | A | | 12/1998 | Upender et al. |
| 6,314,099 | B1 | * | 11/2001 | Fujisawa et al. ............ 370/392 |
| 6,434,432 | B1 | * | 8/2002 | Hao et al. ...................... 700/1 |
| 6,647,440 | B1 | * | 11/2003 | Birns et al. .................. 710/29 |
| 6,732,254 | B1 | * | 5/2004 | Slivkoff et al. ............... 712/37 |

FOREIGN PATENT DOCUMENTS

| DE | 41 29 412 A1 | 3/1993 |
| DE | 42 29 931 C2 | 3/1994 |

OTHER PUBLICATIONS

Infineon Technologies: "The On–Chip CAN Interface", C164 Groupn User's Manual, Sep. 1999, pp. 19–1–19–38, XP–002157161.
Intel: "CAN Serial Communications Controller", Apr. 1996, pp. 7.1–7.42, XP–002157394.
Martin Embacher: "Replacing Dedicated Protocol Controllers with Code Efficient and Configurable Microcontrollers—Low Speed CAN Network Applications", *National Semiconductor Application Note 1048*, May 1997, pp. 1–8, XP–002157760.

* cited by examiner

*Primary Examiner*—Kim Huynh
*Assistant Examiner*—David Martinez
(74) *Attorney, Agent, or Firm*—Laurence A. Greenberg; Werner H. Stemer; Ralph E. Locher

(57) ABSTRACT

A description is given of a receiving device for receiving data. The receiving device extracts from the received data a specific part thereof and, depending on the content of the extracted data, decides how it must handle the received data. The receiving device described is distinguished by the fact that it determines, depending on a part of the extracted data, how the received data might have to be handled, and that, taking account of the result of this determination, it determines how the received data are actually to be handled. Such a receiving device can decide, quickly and simply with a low outlay under all circumstances, how the received data are to be handled.

17 Claims, 2 Drawing Sheets

RECEIVING DEVICE FOR RECEIVING DATA

BACKGROUND OF THE INVENTION

Field of the Invention

The present invention relates to a receiving device for receiving data. The receiving device extracts from received data a specific part thereof and, depending on a content of the extracted data, decides how it must handle the received data.

Receiving devices of this type are used for example in units connected to a controller area network (CAN) bus. CANs are a widely used network that has been known for many years for connecting units disposed in a decentralized manner.

The units connected to a CAN bus contain a CAN controller which is responsible for outputting data to be transmitted onto the CAN bus and/or for receiving data transmitted via the CAN bus and contains, inter alia, the above-mentioned receiving device. Further components (for example a CPU) which provide the data to be transmitted and/or process the received data, and interfaces between the CAN controller and the further components of the units connected to the CAN bus. The interfaces are designated as message objects and are formed by memories or memory areas of greater or lesser size.

In the case of CAN, data are transmitted in units of so-called messages. A message contains a specific number of data bits and is subdivided into a plurality of fields. One of the fields is the so-called identifier field. The identifier field contains 11 bits (standard CAN identifier) or 29 bits (in the case of the CAN 2.0B protocol) and contains details about the content of the received data, more precisely details about the information requested or transmitted by the relevant message.

The data contained in the identifier field may specify, for example, that the relevant message relates to an oil temperature, more precisely that the data that are actually to be transmitted (and are transmitted in the so-called data field of the message) are the oil temperature, or that the information requested by the unit which outputs the message is the oil temperature.

The content of the identifier field is that part of the data which the receiving device extracts from the received data (from the message) in order to define how it must handle the received data (the message).

In the example considered, i.e. when the receiving device is used in a CAN controller, the receiving device decides, depending on the content of the identifier field, whether and, if appropriate, to which message object the respective message is to be fed.

If, by way of example, the identifier field indicates that the message containing the identifier field relates to the oil temperature, then the receiving devices of all the units which operate in a manner dependent on the oil temperature or require information items regarding the oil temperature for other purposes, or the receiving devices of all the units which can determine and output the oil temperature, receive the relevant message and forward it or selected parts thereof to the message object which is assigned to that component of the unit containing the receiving device which processes or determines the oil temperature. The receiving devices of all other units disregard the relevant message.

Various possibilities exist for determining how the receiving device must handle data (messages) received via the CAN bus.

A first possibility is illustrated in FIG. 2 and is described below with reference thereto.

The configuration illustrated in FIG. 2 shows parts of the receiving device and the message objects of a unit connected to a CAN bus CAN and contains an extraction device EXT, message objects MO1, MO2, . . . , MOn, an XOR element XOR, an AND element AND, and a comparison device C. The extraction device EXT extracts the identifier field from messages transmitted via the CAN bus CAN and stores it in an identifier memory EXT-IM. The message objects MO1, MO2, . . . , MOn each contain an identifier memory MO1-IM, MO2-IM, . . . and MOn-IM, respectively, an acceptance mask memory MO1-AM, MO2-AM, . . . and MOn-AM, respectively, and further memories MO1-DATA, MO2-DATA, . . . and MOn-DATA, respectively, and MO1-CTRL, MO2-CTRL, . . . and MOn-CTRL, respectively. An identifier assigned to the respective message objects is in each case stored in the identifier memories MO1-IM, MO2-IM, . . . and MOn-IM. Acceptance masks assigned to the respective message objects are stored in the acceptance mask memories MO1-AM, MO2-AM, . . . and MOn-AM, and there being stored in the memories MO1-DATA, MO2-DATA, . . . and MOn-DATA and MO1-CTRL, MO2-CTRL, . . . and MOn-CTRL the messages or selected parts of the messages whose identifiers correspond to the identifiers stored in the respective message objects in the parts determined by the respective acceptance mask. The XOR element subjects the identifier stored in the identifier memory EXT-IM of the extraction device EXT and the identifier stored in the identifier memory MO1-IM, MO2-IM, . . . and MOn-IM of a selected message object MO1, MO2, . . . and MOn, respectively, to XORing bit by bit. The AND element AND subjects the result of the XORing and the acceptance mask stored in the acceptance mask memory MO1-AM, MO2-AM, . . . and MOn-AM of the selected message object MO1, MO2, . . . and MOn, respectively, to ANDing bit by bit. The comparison device C checks whether the result of the ANDing is equal to or not equal to zero.

The receiving device checks by the above-mentioned XORing and the above-mentioned ANDing in order for each message object whether the identifier extracted from the currently transmitted message by the extraction device EXT corresponds to the identifier stored in the respective message objects in the parts determined by the respective acceptance mask. Such correspondence is present if the value zero is output by the AND element AND. When a correspondence is ascertained, the receiving device writes the currently transmitted message or selected parts thereof to the memories MO1-DATA, MO2-DATA, . . . and MOn-DATA, respectively, and MO1-CTRL, MO2-CTRL, . . . and MOn-CTRL, respectively, of the relevant message object. Otherwise, the check is continued for the next message object. If a correspondence does not result for any of the message objects, the receiving device disregards the currently transmitted message.

The operations that proceed in detail here will be described briefly using an example.

Suppose that the correspondence check begins with the first message object MO1. Then the identifier stored in the identifier memory EXT-IM of the extraction device EXT and the identifier stored in the identifier memory MO1-IM of the first message object MO1 are subjected to XORing, and the result of the XORing and the acceptance mask stored in the acceptance mask memory MO1-AM of the first message object MO1 are subjected to ANDing.

If the identifier stored in the identifier memory EXT-IM of the extraction device EXT and the identifier stored in the identifier memory MO1-IM of the first message object MO1 correspond, the XORing result and thus also the ANDing result are equal to 0. If the comparison device C ascertains that the value 0 is fed to it, it ends the correspondence check and causes the message currently transmitted via the CAN bus CAN or a selected part thereof to be stored in a memory area reserved therefore of the first message object MO1 and to be provided for fetching by another component.

If the identifier stored in the identifier memory EXT-IM of the extraction device EXT and the identifier stored in the identifier memory MO1-IM of the first message object MO1 do not correspond, it depends on the acceptance mask stored in the acceptance mask memory MO1-AM of the first message object MO1 whether the ANDing result becomes equal to 0 or not equal to 0. If the acceptance mask has a 0 at those locations at which the identifiers subjected to XORing differ, the result becomes equal to 0 in this case, too. The consequence of this, as in the case described above, is that the correspondence check ends, and the message currently transmitted via the CAN bus CAN or a selected part thereof is caused to be written to the first message object MO1 and to be provided for fetching by another component.

The provision of the acceptance mask and the ANDing thereof with the XORing result has the effect that the identifier extracted from the message is compared with a group of identifiers containing a plurality of different identifiers in a single work operation. This is expedient if messages having different identifiers can or must be fed to a message object, and proves to be advantageous because the number of correspondence checks can thereby be kept low.

If the ANDing result is not equal to 0, then the currently transmitted message is not a message that is to be fed to the message object MO1. The comparison device C thereupon causes the correspondence check to be continued with another message object, for example with the message object MO2, as a result of which a check is made to determine whether the currently transmitted message is a message which is to be fed to the message object MO2. The correspondence check is affected as with the first message object MO1.

If it is found in this case that the currently transmitted message is a message which is to be fed to the message object MO2, the correspondence check is ended and the message currently transmitted via the CAN bus CAN or a selected part thereof is caused to be stored in the memory area reserved therefore of the second message object MO2 and to be provided for fetching by another component.

By contrast, if the currently transmitted message is not a message which is to be fed to the message object MO2, then the comparison device C again causes the correspondence check to be carried out for another message object, for example for the message object MOn. In this case, the operations described above are repeated.

If the correspondence check has been carried out for all of the message objects and no message object to which the currently transmitted message is to be fed has been found, the receiving device does not receive the relevant message.

The above-described checking has serious disadvantages primarily when the unit containing the receiving device contains many message objects. It lasts a long time and, owing to the frequent accesses to the memory device forming the message objects, delays the fetching and further processing of the messages or message parts stored in the message objects. The provision of the acceptance masks only partly remedies this. For this purpose, it is necessary that the identifiers of the messages which are to be fed to a specific message object differ only in the bits masked out by the acceptance mask, and that only as many and such bits are masked out that the message objects are not also fed those message objects which are not intended to be fed to them at all, which, however, is in practice often not the case for various reasons which will not be discussed in any further detail here.

A further possibility for determining how the receiving device must handle data (messages) received via the CAN bus is illustrated in FIG. 3 and is described below with reference thereto.

The configuration illustrated in FIG. 3 shows parts of the receiving device and the message objects of a unit connected to a CAN bus CAN and contains an extraction device EXT, message objects MO1, MO2, . . . , MOn, a selection device SEL formed by a multiplexer, for example, and a (pointer) memory PM. The extraction device EXT corresponds to the extraction device EXT shown in FIG. 2. The message objects MO1, MO2, . . . , MOn correspond with regard to function and practical realization to the message objects MO1, MO2, . . . , MOn of the configuration shown in FIG. 2, but have no identifier memory and no acceptance mask memory and also do not store an identifier and an acceptance mask elsewhere. The pointer memory has a number of memory elements (that is to say $2^{11}$ or $2^{29}$ memory elements) corresponding to the number of possible identifiers and there being stored in each memory element a value (a pointer) which specifies which message object is to be fed a message with an identifier corresponding to the ordinal number of the respective memory element. The selection device SEL has a number of input terminals corresponding to the number of memory elements of the pointer memory and, on the input side, are connected to all the memory elements of the pointer memory PM. The selection device is controlled by the identifier extracted from the transmitted message, and outputs a pointer designating the message object to which the currently transmitted message is to be forwarded.

The pointer memory PM and the selection device SEL make it possible to determine in a single work operation whether and, if appropriate, to which message object the message currently transmitted via the CAN bus CAN is to be fed.

The same applies correspondingly to the case where the identifier extracted from the message is used as an address for addressing the pointer memory PM; in this case, the selection device SEL could be dispensed with.

The determination—which can be carried out by the configuration described—of whether and, if appropriate, to which message object the message currently transmitted via the CAN bus CAN is to be fed can be realized only with a very large outlay, however, in particular owing to the required size of the pointer memory PM, both in the case of hardware realization and in the case of software realization.

SUMMARY OF THE INVENTION

It is accordingly an object of the invention to provide a receiving device for receiving data which overcomes the above-mentioned disadvantages of the prior art devices of this general type, in which a decision regarding how the receiving device must handle the received data can be taken quickly and simply with a low outlay.

With the foregoing and other objects in view there is provided, in accordance with the invention, a receiving device. The receiving device contains an extractor or extraction means for extracting from received data a specific part thereof resulting in extracted data, and a determining device or determination means for determining, in dependence on a part of the extracted data, how the received data might have to be handled resulting in a handling decision. The determining device further determines how the received data are actually to be handled, taking into account the handling decision. The determining device receives the extracted data from the extractor.

The receiving device according to the invention is distinguished by the fact that the receiving device determines, depending on a part of the extracted data, how the received data might have to be handled, and that, taking account of the result of this determination, the receiving device determines how the received data are actually to be handled.

Such a two-stage or multi-stage determination of the receiving device behavior can be realized simply and carried out quickly. The configuration that carries out the determination can have a simple construction (manage without a relatively large memory) and nevertheless determine in a short time, and without relatively great obstruction of the remaining components of the unit which contains the configuration, how the receiving device must handle the currently transmitted data.

In accordance with an added feature of the invention, the extracted data contains an information item about a transmitter, a receiver, or a content of the received data.

In accordance with an additional feature of the invention, a decision of the determining device regarding how it must handle the received data is a decision regarding whether the receiving device forwards the received data.

In accordance with another feature of the invention, a decision of the determining device regarding how it must handle the received data is a decision regarding if and how the receiving device processes the received data.

In accordance with a further feature of the invention, the part of the extracted data used to determine how the received data might have to be handled is obtained by a logic combination of the extracted data with a mask.

In accordance with a further added feature of the invention, the determining device has a memory device, and the part of the extracted data used for determining how the received data might have to be handled is used for addressing the memory device.

In accordance with a further additional feature of the invention, the memory device stores information items regarding how the received data might have to be handled. The information items contain details regarding what must be done in order to be able to decide how the received data are actually to be handled. Furthermore, the information items can contain details regarding at least one value with which the extracted data or a selected part thereof must be processed in order to be able to decide how the received data are to be handled. Additionally, the information items contain details regarding where the at least one value with which the extracted data or the selected part thereof must be processed are stored.

In accordance with another further feature of the invention, a processing of the extracted data or of the selected part thereof includes checking whether the extracted data or the selected part thereof correspond to the value or to one of a plurality of specific values.

In accordance with another added feature of the invention, the receiving device is used in a CAN controller.

In accordance with another additional feature of the invention, the part of the extracted data extracted from the received data is an identifier of a message transmitted through a CAN bus. The determining device checks whether the identifier extracted from the message corresponds to identifiers assigned to message objects. If the determining device ascertains a correspondence, the received data is fed to a message object assigned to the identifier to which the identifier extracted from the message corresponds.

With the foregoing and other objects in view there is provided, in accordance with the invention, an apparatus containing an input terminal for receiving data; and a receiving device connected to the input terminal and programmed to extract from the data a specific part thereof resulting in extracted data. The receiving device is further programmed to determine, in dependence on a part of the extracted data, how the data might have to be handled resulting in a handling decision, and the receiving device is also programmed to determine how the data are actually to be handled, taking into account the handling decision.

With the foregoing and other objects in view there is provided, in accordance with the invention, a method for handling data in a receiving device. The method includes the steps of extracting from data received a specific part thereof resulting in extracted data; determining, in dependence on a part of the extracted data, how the data received data might have to be handled resulting in a handling decision; and determining how the data received are actually to be handled taking account of the handling decision.

Other features which are considered as characteristic for the invention are set forth in the appended claims.

Although the invention is illustrated and described herein as embodied in a receiving device for receiving data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
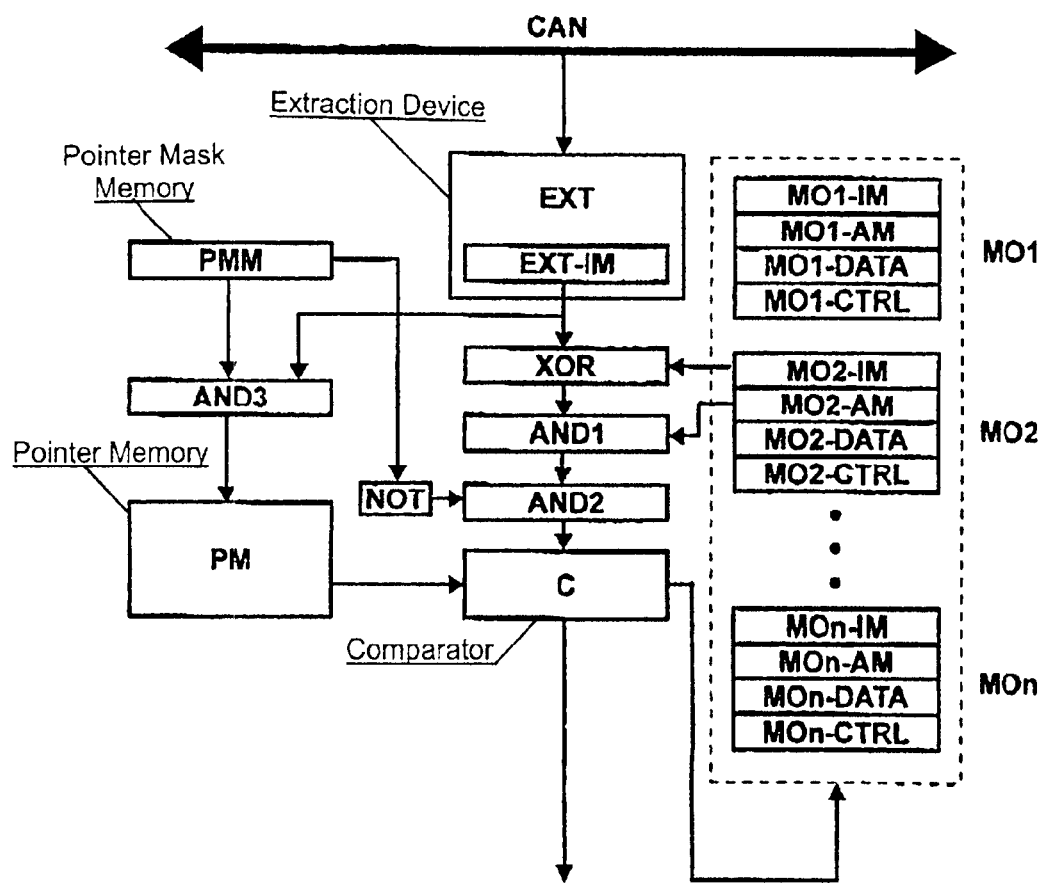
FIG. 1 is a block diagram for illustrating a procedure of how a receiving device handles received data according to the invention.

Referring now to the figures of the drawing in detail and first, particularly, to FIG. 1 thereof, there is shown a receiving device that is part of a unit connected to a CAN bus. However, it can also be used in any other units that forward and/or process further only specific data from the data fed to them.

The data involved in the example considered are in each case the data which represent a message transmitted via the CAN bus. In other systems, of course, any other data units, for example frames or other data packets, may also be involved.

The data which are extracted from the received data and depending on which a decision is taken as to how the receiving device must handle the received data are, in the example considered, the 11 or 29 bits of the identifier field of a message transmitted via the CAN bus. The extracted data contain an information item regarding the content of the relevant message. The special features of the receiving device that are described in more detail below can also be used in correspondingly modified form if the extracted data contain other information items, for example information items about the transmitter or the receiver of the received data.

In the example considered, the decision of the receiving device regarding how it must handle the received data is a decision regarding whether and, if appropriate, whether it forwards the received data.

However, the decision regarding how the receiving device must handle the received data can also be any other decision, for example a decision regarding whether and, if appropriate, how the receiving device processes the received data.

The receiving device which is described in more detail is distinguished by the fact that the receiving device determines, depending on a part of the extracted data, how the received data might have to be handled, and that, taking account of the result of the determination, the receiving device determines how the received data are actually to be handled.

The text below describes, in general form and then using a concrete example, how such a receiving device can be realized. It should be apparent and requires no further explanation that innumerable further possibilities exist for the realization of such a receiving device.

In the example considered, that part of the extracted data that is used to determine how the received data is to be handled is obtained by masking out specific bits of the extracted data. It being a matter, in principle, of free choice as to which bits and how many bits are masked out. The part of the extracted data that is used to determine how the received data might have to be handled is used for addressing a memory device. Information items regarding how the data might have to be handled are stored in a memory device. The information items stored in the memory device contain details regarding what must be done in order to be able to decide how the received data are actually to be handled (in the example considered details regarding the value or values with which the extracted data or a selected part thereof must be processed, and/or details regarding where the value or values with which the extracted data or the selected part thereof must be processed are stored). The processing of the extracted data or of the selected part thereof includes checking whether the latter correspond to a specific value or to one of a plurality of specific values.

One possible practical realization of the receiving device which has initially been described in general terms is shown in FIG. 1 and is described in more detail below with reference thereto. FIG. 1 shows those parts of the receiving device and of the message objects that are of particular interest in the present case.

Figure 2:
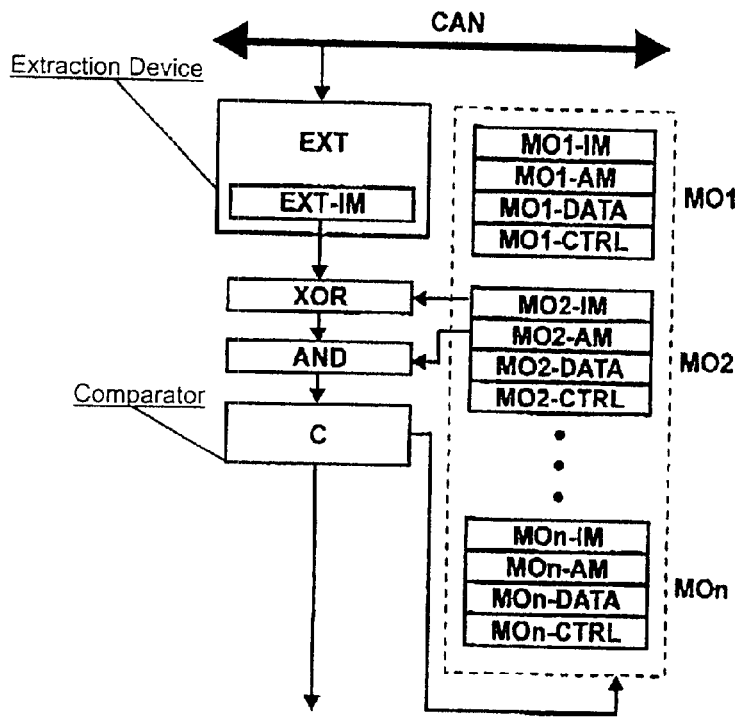
FIGS. 2 and 3 are block diagrams illustrating conventional procedures in the determination of how the receiving device handles received data.
Figure 3:
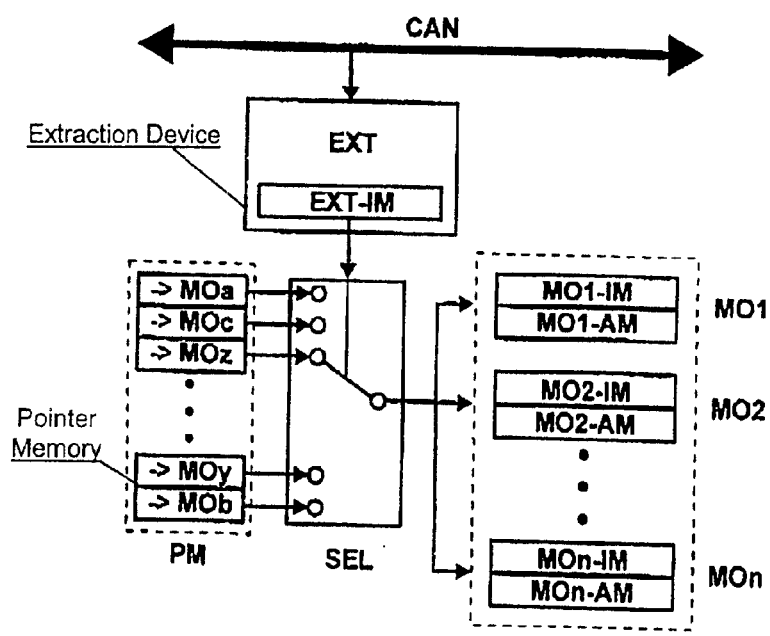

The configuration shown in FIG. 1 contains an extraction device EXT, message objects MO1, MO2, . . . , MOn, an XOR element XOR, a first AND element AND1, a second AND element AND2, a pointer mask memory PMM, a third AND element AND3, a pointer memory PM, a NOT element NOT and a comparison device C. The extraction device EXT corresponds to the extraction devices EXT that are shown in FIGS. 2 and 3 and have been described with reference thereto. The message objects MO1, MO2, . . . , MOn correspond to the message objects MO1, MO2, . . . , MOn which are shown in FIG. 2 and have been described with reference thereto. The XOR element XOR corresponds both with regard to the construction and with regard to the data subjected to XORing to the XOR element XOR which is shown in FIG. 2 and has been described with reference thereto. The first AND element AND1 corresponds both with regard to the construction and with regard to the data subjected to ANDing to the AND element AND which is shown in FIG. 2 and has been described with reference thereto. The pointer mask memory PMM contains a mask which (in interaction with the third AND element AND3) defines that part of the identifier extracted from the message that is used to determine how the received data might have to be handled.

The third AND element AND3 subjects the mask stored in the pointer mask memory PMM and the identifier extracted from the currently transmitted message to ANDing bit by bit. The pointer memory PM is addressed by the result of the ANDing carried out by the AND element AND3, and contains information items regarding how the received data might have to be handled, more precisely containing entries which specify the message object or message objects to which identifiers are assigned which correspond to the identifier extracted from the message in that part thereof which is not masked out, and outputs the read-out data to the comparison device C. The NOT element NOT carries out a bit-by-bit inversion of the mask stored in the pointer mask memory PMM. The second AND element AND2 subjects the data output by the NOT element NOT and the data output by the first AND element AND1 to ANDing bit by bit. The comparison device C checks whether the result output by the second AND element AND2 is equal or not equal to 0 and, depending thereon, providing for continuation or ending of the checking.

As has already been mentioned above, the extraction device EXT, the message objects MO1, MO2, . . . , MOn, the XOR element XOR and the first AND element AND1 operate and cooperate like the corresponding elements of the configuration which is shown in FIG. 2 and has been described with reference thereto in the introduction. With regard to further details in this respect, reference is made to the explanations referring to FIG. 2.

However, in the configuration shown in FIG. 1—in contrast to the configuration shown in FIG. 2—checking as to whether the currently transmitted message is to be fed to all the message objects MO1, MO2, . . . , MOn is not effected in order for all the message objects. The checking is effected only for one or a plurality of selected message objects.

The selection of the message objects to be taken into account is effected by the pointer mask memory PMM, the third AND element AND3, and the pointer memory. The mask stored in the pointer mask memory PMM and the identifier extracted from the message are subjected to ANDing, as a result of which specific bits of the identifier are masked out and that part of the identifier which is not masked out is used further. This part of the identifier is used for addressing the pointer memory PM, which, as has already been explained above, contains under the respective addresses entries (pointers) which specify the message object or message objects which identifiers are assigned which correspond to the identifier extracted from the message in that part thereof which is not masked out. The output signal—containing the pointer or the pointers—of the pointer memory PM is used as a selection signal for the selection of the message objects whose identifiers are to be compared by the XOR element XOR and the first AND element AND1 with the identifier extracted from the message or a selected part thereof. As a result, the decision as to whether and, if appropriate, to which message object the currently transmitted message is fed can be effected considerably more rapidly than is the case with the configuration shown in FIG. 2. The components, namely the pointer mask memory PMM, the third AND element AND3 and the pointer memory PM, required for the selection of the message objects whose identifiers are to be compared by the XOR element XOR and the first AND element AND1 with the identifier extracted from the message can be realized without a large outlay. In particular, the pointer memory PM can be very small in comparison with the pointer memory PM of the configuration shown in FIG. 3, since it is only addressed by a part of the identifier.

Preferably, a possibility is provided in order to deactivate the preselection of the message objects whose identifiers are to be compared by the XOR element XOR and the first AND element AND1 with the identifier extracted from the message or a selected part thereof and to check all the message objects in order by the XOR element XOR and the first AND element AND1 as in the configuration in accordance with FIG. 2. Provided that use is not intended to be made of the additional possibility—described below—of using the pointer mask (combination with the output signal of the second AND element AND2), the deactivation of the message object preselection can be achieved by setting the pointer mask to a specific value (to the value 0 in the example considered).

Provision may also be made for carrying out the object message preselection only for some of the object messages and for comparing the identifiers of the remaining object messages with the identifiers extracted from the messages or selected parts thereof in order as in the arrangement in accordance with FIG. 2.

In particular for the case where the preselection of the message objects whose identifiers are to be compared by the XOR element XOR and the first AND element AND1 with the identifier extracted from the message or a selected part thereof is deactivated, it proves to be advantageous if, as in the example considered, provision is made for subjecting the result output by the first AND element AND1 and the pointer mask from the pointer mask memory PMM, the pointer mask being inverted by the NOT element NOT, to a logic combination (which is carried out by the second AND element AND2 in the example considered) and to make it dependent on the result of this combination whether and, if appropriate, to which message object the currently transmitted message is to be fed. As a result, in the comparison of the identifiers stored in the message objects with the identifiers extracted from the messages, consideration can be given even more flexibly to individual special features of the system. The provision of the NOT element NOT makes it possible for this mechanism to remain active with activated message object preselection. The fact that the mechanism is also active with activated message object preselection proves to be advantageous because this can facilitate the creation of the acceptance masks stored in the message objects.

The receiving device described can ultimately decide, quickly and simply with a low outlay under all circumstances, how the received data are to be handled.

We claim:

1. A receiving device, comprising:
a controller device for receiving a message having data;
extraction means for extracting from received data of the message a specific part thereof resulting in extracted data;
determination means for determining a plurality of processing possibilities for how the received data are to be handled, in dependence on a part of the extracted data, resulting in a handling decision, said determination means including a mask memory containing a mask for determining said part of the extracted data, said determination means further including a pointer memory coupled to said mask memory, said part of the extracted data being used to selectively address said pointer memory for determining said plurality of processing possibilities; and
taking into account the handling decision, said determination means further determining how the received data are actually to be handled by selecting a certain processing possibility from the plurality of processing possibilities.

2. The receiving device according to claim 1, wherein the extracted data contains an information item about one of a transmitter, a receiver, and a content of the received data.

3. The receiving device according to claim 1, wherein a decision of said determination means regarding how it must handle the received data is a decision regarding whether and whereto the receiving device forwards the received data.

4. The receiving device according to claim 1, wherein a decision of said determination means regarding how it must handle the received data is a decision regarding whether or not and how the receiving device processes the received data.

5. The receiving device according to claim 1, wherein the part of the extracted data used to determine the handling decision is obtained by a logic combination of the extracted data with a mask.

6. The receiving device according to claim 1, wherein said memory device stores information items regarding the handling decision.

7. The receiving device according to claim 6, wherein the information items stored in said memory device contain details regarding what must be done in order to be able to decide how the received data are actually to be handled.

8. The receiving device according to claim 6, wherein the information items stored in said memory device contain details regarding at least one value with which the extracted data or a selected part thereof must be processed in order to be able to decide how the received data are to be handled.

9. The receiving device according to claim 8, wherein the information items stored in said memory device contain details regarding where the at least one value with which the extracted data or the selected part thereof must be processed are stored.

10. The receiving device according to claim 8, wherein a processing of the extracted data or of the selected part thereof includes checking whether the extracted data or the selected part thereof correspond to a specific value or to one of a plurality of specific values.

11. The receiving device according to claim 1, wherein the receiving device is used in a CAN controller.

12. The receiving device according to claim 11, wherein the data extracted from the received data is an identifier of a message transmitted through a CAN bus.

13. The receiving device according to claim 12, wherein said determination means checks whether the identifier extracted from the message corresponds to identifiers assigned to message objects.

14. The receiving device according to claim 13, wherein if said determination means ascertains a correspondence, the received data is fed to a message object assigned to the identifier to which the identifier extracted from the message corresponds.

15. An apparatus, comprising:

an input terminal for receiving data; and a receiving device connected to said input terminal and programmed to extract from the data a specific part thereof resulting in extracted data, said receiving device further programmed to determine, in dependence on a part of the extracted data, a plurality of processing possibilities for how the data are to be handled resulting in a handling decision, said receiving device including a mask memory containing a mask for determining said part of the extracted data, said receiving device further including a pointer memory coupled to said mask memory, said part of the extracted data being used to selectively address said pointer memory for determining said plurality of processing possibilities; and said receiving device programmed to determine by selecting a certain processing possibility from the plurality of processing possibilities how the data are actually to be handled, taking into account the handling decision.

16. A method for handling data in a receiving device, which comprises the steps of:

receiving a message containing data;

extracting from received data a specific part thereof resulting in extracted data;

determining, in dependence on a part of the extracted data, a plurality of processing possibilities for how the data received are to be handled resulting in a handling decision, the determining step including using a mask memory containing a mask for determining the part of the extracted data and using a pointer memory coupled to the mask memory, to receive the certain part of the extracted data and to determine the plurality of processing possibilities; and determining by selecting a certain processing possibility from the plurality of processing possibilities how the data received are actually to be handled taking account of the handling decision.

17. A receiving device, comprising:

extraction means for extracting from received data a specific part thereof resulting in extracted data;

determination means for determining, in dependence on a part of the extracted data, how the received data are to be handled resulting in a handling decision and further determining, taking into account the handling decision, how the received data are actually to be handled and whether or not to receive the remainder of the received data; said determination device including:

a plurality of message objects each having an identifier memory and an acceptance mask memory;

combinational logic coupled to the extraction means and the plurality of message objects, said combinational logic being configured to compare the extracted data to said identifier memory and said acceptance mask memory and to generate a result output based on the comparison;

a pointer mask memory coupled to the combinational logic, said pointer mask memory having a mask to define a portion of said extracted identifier used to determine how to handle the received data;

a pointer memory coupled to the pointer mask memory via said combinational logic, said pointer memory having a selection output to select at least one of said plurality of message objects to be compared with said extracted identifier; and a comparator checking said result output.

* * * * *